(12) United States Patent
Hershkovitz

(10) Patent No.: US 7,726,601 B2
(45) Date of Patent: Jun. 1, 2010

(54) DEVICE AND METHOD FOR AFFECTING LOCAL CLIMATIC PARAMETERS

(76) Inventor: Bruno Hershkovitz, 40/4 Yoseftal Street, Bat Yam 59552 (IL)

( * ) Notice: Subject to any disclaimer, the term of this patent is extended or adjusted under 35 U.S.C. 154(b) by 314 days.

(21) Appl. No.: 11/785,810

(22) Filed: Apr. 20, 2007

(65) Prior Publication Data

US 2008/0030884 A1  Feb. 7, 2008

Related U.S. Application Data

(60) Provisional application No. 60/794,111, filed on Apr. 24, 2006.

(51) Int. Cl.
*B64B 1/00* (2006.01)
*B64D 3/00* (2006.01)

(52) U.S. Cl. ...................... 244/30; 244/1 TD

(58) Field of Classification Search .................. 244/30, 244/31, 1 TD, 171.1; 135/96, 117, 115, 119
See application file for complete search history.

(56) References Cited

U.S. PATENT DOCUMENTS

| | | | | |
|---|---|---|---|---|
| 2,538,719 A * | 1/1951 | Weinberg et al. | ........... | 273/361 |
| 4,364,532 A * | 12/1982 | Stark | ........... | 244/30 |
| 4,931,028 A * | 6/1990 | Jaeger et al. | ........... | 446/225 |
| 5,395,070 A * | 3/1995 | Stirbl et al. | ........... | 244/2 |
| 5,678,783 A * | 10/1997 | Wong | ........... | 244/1 R |
| 6,382,557 B1 * | 5/2002 | Lafuma et al. | ........... | 244/12.2 |
| 6,571,815 B1 * | 6/2003 | Hill | ........... | 135/96 |
| 6,698,693 B2 * | 3/2004 | Davidson et al. | ........... | 244/171.5 |
| 7,213,931 B2 * | 5/2007 | Strieber | ........... | 359/853 |
| 2003/0075642 A1 * | 4/2003 | Silansky et al. | ........... | 244/30 |
| 2003/0142306 A1 * | 7/2003 | Hillis et al. | ........... | 356/326 |

OTHER PUBLICATIONS

Hoffman, R.N., "Controlling Hurricanes", *Scientific American*, 5 pages, (Oct. 2004).
Hoffman, R.N., "Controlling the Global Weather", *Bulleting of the American Meteorological Society*, pp. 241-248, (Feb. 2002).

* cited by examiner

*Primary Examiner*—Tien Dinh
(74) *Attorney, Agent, or Firm*—The Nath Law Group; Derek Richmond; Jiaxiao Zhang

(57) ABSTRACT

A system for affecting a local parameter, the system comprising a sunlight radiation reflecting surface, and a propulsion mechanism, the propulsion mechanism being adapted to move the reflecting surface to a predetermined position being chosen based on the effect of the system on said local parameter at the position.

12 Claims, 3 Drawing Sheets

DEVICE AND METHOD FOR AFFECTING LOCAL CLIMATIC PARAMETERS

This is a Non-Provisional Application of U.S. Provisional Patent Application No. 60/794,111, filed on Apr. 24, 2006, the entire content of which is hereby incorporated by reference in its entirety.

FIELD OF THE INVENTION

This invention relates to devices used to control local climatic conditions, such as oceanic parameters, particularly directed to affecting weather patterns.

BACKGROUND OF THE INVENTION

Hurricanes are a much-studied phenomenon. While there is much which is not understood, the necessary conditions for formation are thought to be well-understood. One of these conditions is that a thunderstorm passes over an area of oceanic water which has been heated to at least 80°-82° F. at a depth of at least 150 feet. The air from the surface of the ocean, which is warm and humid, begins to rapidly rise. As it rises, the water vapor in the air condenses, forming rain droplets and storm clouds, and releasing heat in the form of latent heat of condensation. This latent heat warms cool air above it, causing it to rise. Warm, humid air from the ocean surface replaces the rising air. As this cycle progresses, heat from the ocean surface is drawn into the atmosphere, creating a pattern of circulating wind. Under the proper conditions, such as appropriate amounts of wind shear and pressure gradients, the hurricane may fully develop.

Articles by Ross N. Hoffman in the February, 2002 issue of the *Bulletin of the American Meteorological Society*, entitled *Controlling the Global Weather*, and in the October, 2004 issue of Scientific American, entitled *Controlling Hurricanes*, underscore the importance of small changes in temperature, and that the most effective way to limit wind damage caused by hurricane winds would be to make "the greatest modifications to the beginning temperature near the storm's eye." Alterations of temperature of as little as 0.5° C. had effects which extended as far as 500-600 miles from the eye.

There have been previous attempts to prevent the formation of hurricanes. In the early 1960s, in an attempt to create ancillary storms adjacent a hurricane to draw energy therefrom, areas near the hurricane were seeded with silver iodine crystals, with inconclusive results. Since then, weather planes have been flown into hurricanes at up to 40,000 ft., releasing chemicals at different points and time intervals in an attempt to mitigate the power of the storm. Results, of this project were non-conclusive.

Since the conditions necessary for formation of hurricanes is generally known, their formation and path can be predicted to a certain degree, using information collected by weather satellites and other equipment which gathers meteorological information.

SUMMARY OF THE INVENTION

The present invention is directed toward deploying large atmospheric reflecting surfaces above the surface of the earth, either above the ocean or land, in order to have an effect on local temperatures. For example, when over the ocean, an increase of the water temperature due to solar radiation may be prevented in areas which may serve as starting points of tropical storms, thus limiting their strength, or preventing them from forming in the first place.

There is therefore provided according to one aspect of the present invention a system for affecting local parameters, such as in the ocean, seas, or other places, such as near or on glaciers, icebergs, or at or near the North or South Pole. The system comprises a sunlight radiation reflecting surface, and a propulsion mechanism. The propulsion mechanism is adapted to move the reflecting surface to a predetermined position, such as above a body of water, which is chosen based on the effect the system would have at that position on the local parameter.

The system may further comprise a flotation mechanism adapted to maintain the reflecting surface at or near a predetermined height.

The propulsion mechanism may comprise an airborne vehicle, which may be unmanned.

The propulsion mechanism may comprise motor units, which may be either electrically or jet powered. In the case of electrically-powered motor units, solar panels may be integral with the motor or as part of the reflecting surface in order to provide power to the motor units.

The flotation mechanism may comprise at least one inflatable structure, such as a balloon, filled with a lighter-than-air gas, such as helium. In such a case, at least a portion of the reflecting surface may be integral with the flotation mechanism.

In addition, the system may comprise a ground tether, i.e., a restraint, such as a rope or system of ropes, to hold the system substantially in one place.

A control station may be part of the system and be adapted to receive information, which may be real-time, regarding local parameters, and, based on said information, issue instructions to the propulsion mechanism. The information may be received from a weather satellite or other meteorological equipment. The information may include data concerning local cloud cover, air currents which may affect the local parameters, and intensity of sunlight.

The control station may be airborne by said system or by another airborne vehicle, or it may be a ground station.

The parameter may be the local water temperature of the ocean, seas, or other places, such as near or on glaciers, icebergs, or at or near the North or South Pole.

The system may be adapted to selectively position said reflecting surface to reflect sunlight away from the Earth.

The system may be adapted to selectively position said reflecting surface to reflect sunlight toward a predetermined location on the Earth. The reflecting surface may attached to said propulsion mechanism, with the propulsion mechanism being adapted to reposition the reflecting surface in order to maintain the location of the reflected sunlight on the predetermined position. The reflecting surfaces may be attached to the propulsion mechanism via cables, which may be, inter alia, any rope made of synthetic or natural fibers, high-strength lines, chains, etc.

According to another aspect of the present invention, there is provided a method for affecting local parameters of the ocean, seas, or other places, such as near or on glaciers, icebergs, or at or near the North or South Pole, comprising the steps of:

(a) providing a one or more reflecting surfaces;
(b) providing a propulsion mechanism adapted to move the one or more reflecting surfaces to one or more predetermined positions;
(c) providing a control station adapted to receive information about local oceanic parameters, to decide locations in need of parametric influence, and to generate a control signal; and (d) deploying said reflecting surfaces to the vicinity of said locations.

In addition, a flotation mechanism may be provided. The flotation mechanism is adapted to maintain the reflecting surface at or near a predetermined height.

The parameter may be the local temperature, and the desired influence may be to lower the temperature. This may be accomplished by reflecting the sunlight away, similar to an "umbrella effect".

Alternatively, the desired influence may be to raise the temperature. This may be accomplished by redirecting the sunlight toward the desired place, wherein the reflecting surface acts as a "floating mirror".

The method may further comprise the step of selectively positioning the one or more reflecting surfaces to reflect sunlight away from the location, or the step of selectively positioning the one or more reflecting surfaces to reflect sunlight toward the location.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF EMBODIMENTS

Figure 1A:
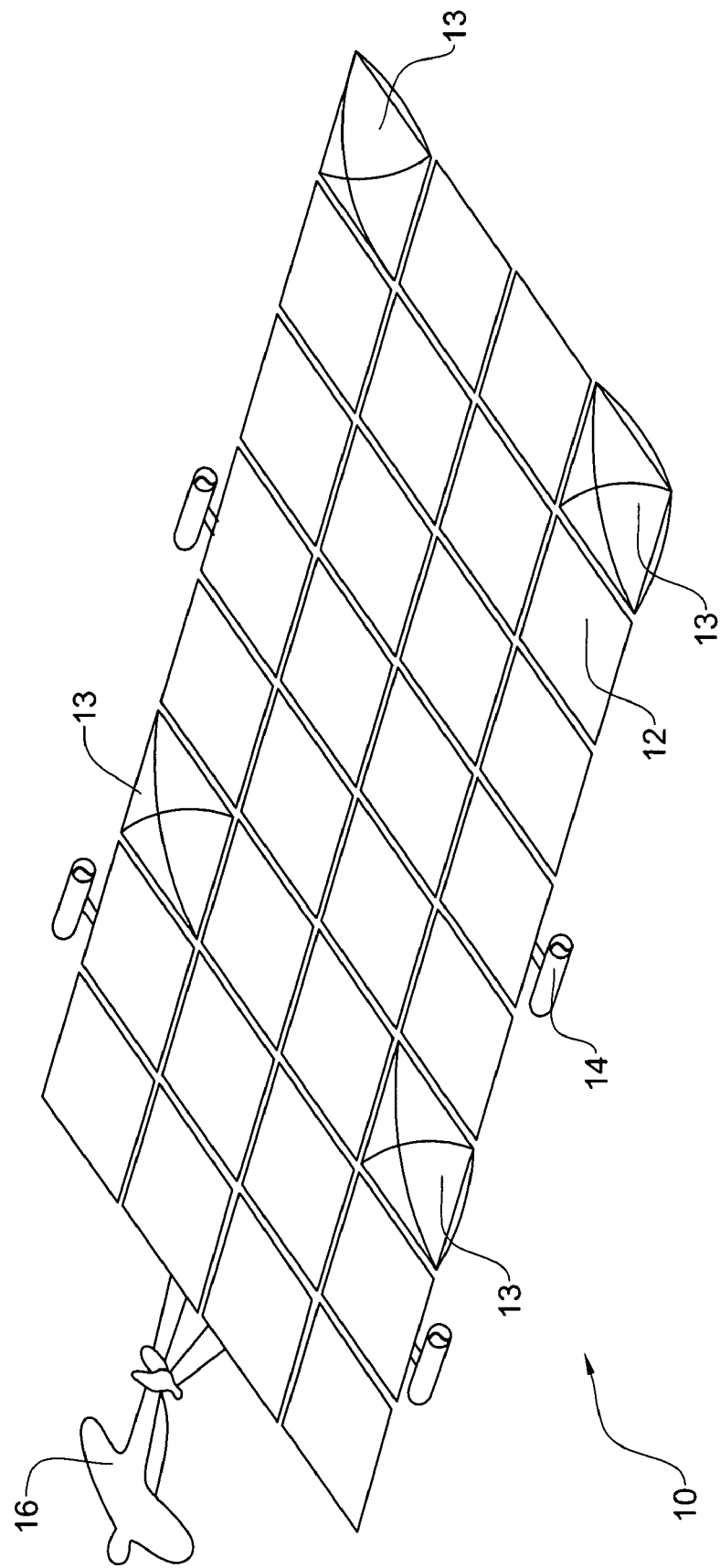
FIG. 1A is perspective view of a system according to the present invention.

As seen in FIG. 1A, there is provided a system, generally indicated at 10, for reflecting solar radiation. The system comprises a plurality of panels 12 tethered together so as to form a surface. According to one particular embodiment, at least some of the panels are in the form of inflatable structures, such as balloons, as indicated at 13, and are filled with a lighter-than-air gas, such as helium, in order to keep the system 10 aloft in the air at a predetermined height. In addition, motor units 14 are provided to guide the system. The inflatable structures 13 may be formed as rectangular or square in shape, at least when viewed from the top, or in any other desirable shape.

According to one modification, the reflective surfaces are articulated to the inflatable structures.

Figure 1B:
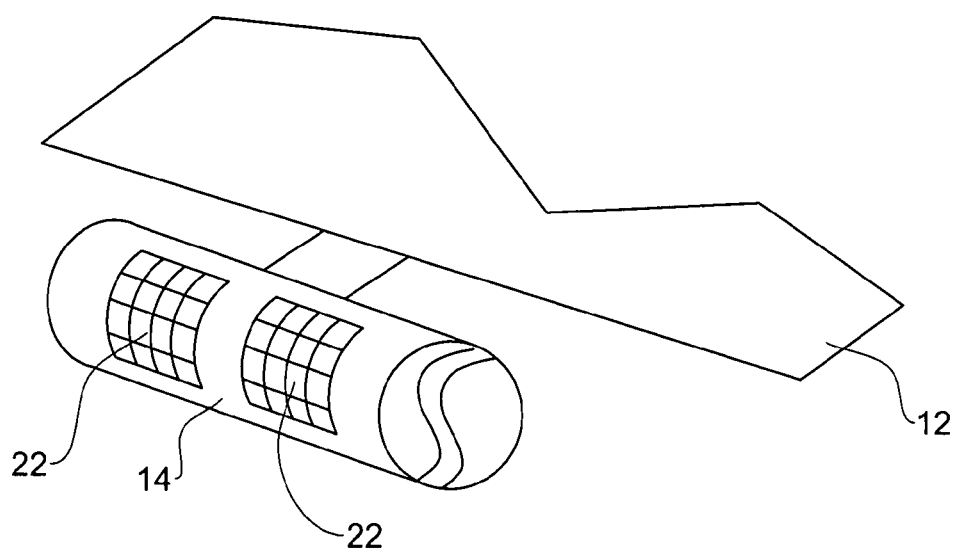
FIG. 1B is a close-up view of a motor unit of the system illustrated in FIG. 1A.

The panels 12 may be made from a light material, such as polyethylene/nylon, and covered with a shiny metallic material, e.g., Mylar™. Alternatively, they may be made from or coated with a reflective film, such as Mylar™. In the present example, each panel 12 is approximately 5×5 meters. As shown in FIG. 1, thirty two panels, at least some being in the form of inflatable structures and filled with a lighter-than-air gas, are attached to cover a total area of about 800 square meters (approximately 8600 square feet). However, this number may vary at the discretion of a user.

The motor units 14 are light-weight and are electrically powered. Since the system 10 is meant to be used in areas of high sunlight radiation, the motor units 14 may comprise solar panels (not shown) for powering them. The solar panels may be mounted on the motor units 14, as indicated at 22 in FIG. 1B, or they may replace some of the panels 12 of the array 10 or be portions of some of the panels.

The system 10 is towed by an airborne vehicle 16, which may be a UAV which is remotely controlled. Alternatively, the system 10 may be towed to a general desired vicinity by a manned plane, which then releases it. Once the system 10 has been towed to the desired vicinity, the airborne vehicle 16 ensures that it stays there, and returns the system 10 there if it is blown off course. The vehicle pulls the system over a predetermined area of water, and may be controlled to return to the same point or area several times. These points and/or area are determined using information provided by data gathering means, such as weather satellites and/or other equipment which gathers meteorological information.

It will be appreciated that a number of systems will need to be deployed in order to reflect a sufficient amount of light to have a noticeable impact on the development of the hurricane. This number is dependent on the size of the panels, and can be determined using data, such as the intensity of the sunlight, local water temperature, and amount of cloud cover, which is provided by the data gathering means. Typically, the effective reflective area of all of the systems will be very large in order to accomplish the intended effect.

It will further be appreciated that a central control computer or computers may be provided. This central computer or computers controls the systems based on continuously updated data from satellites or other meteorological equipment, or if this is not available, from extrapolated data.

Besides preventing hurricanes, the systems 10 can be deployed in other areas in which excess heat creates environmental damage, such as to slow the melting of permafrost, polar icecaps, and icebergs.

It is expected that the money which is saved due to hurricane prevention can be put toward construction and deployment of the systems.

Figure 2:
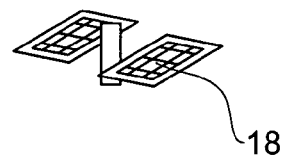
FIG. 2 illustrates how the system may be used.
Figure 2:
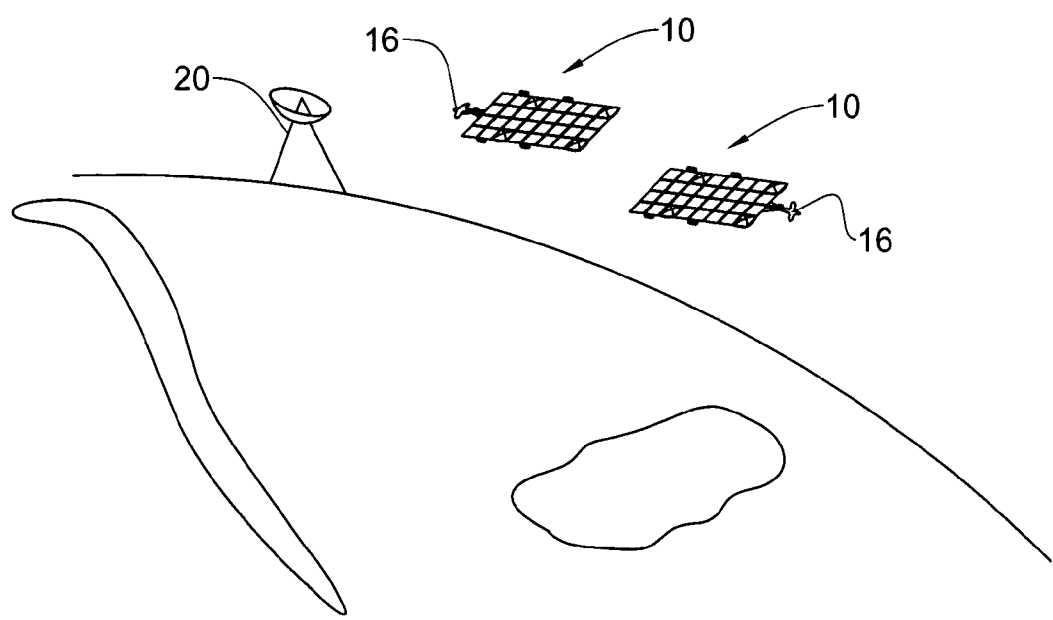

In use, as illustrated in FIG. 2, a weather satellite 18 gathers information concerning a part of the ocean. The information may include data concerning local cloud cover, air currents which may affect the local parameters, and/or intensity of sunlight. The information is sent to a processing center 20, which comprises one or more computers adapted to process the data. Concurrently, the locations of the systems 10 are tracked by the computer. The computer determines critical points or areas which are most in need of coverage by the system. These critical points or areas may be locations of elevated temperatures which lie in the path of an approaching thunderstorm. Alternatively, they may be areas which are frequently visited by thunderstorms, and may be cooled as a preventative measure. In this way, when a thunderstorm does approach, much less cooling is necessary. The computer issues command to the system 10, usually by controlling the vehicle 16, to direct it to those areas. As the areas are cooled, the weather satellites continuously monitor the situation, and new critical points or areas may be determined. The computer then decides whether to redirect systems 10 to the new critical points or areas.

In the event that a hurricane cannot be totally prevented by using the system as described above, it will be appreciated that the severity of the storm can be mitigated by lower temperatures of the ocean surface.

It will be appreciated that the system 10 as described above can be used to influence local parameters besides those occurring in or near oceans. For example, they may be deployed over cities or other populated areas in order to provide shade, thereby cooling the local ambient temperature. They may be tethered at specific locations, and/or provided with motor units, or another similar propulsion mechanism, in order to selectively move them to different locations, as needed.

Figure 3:
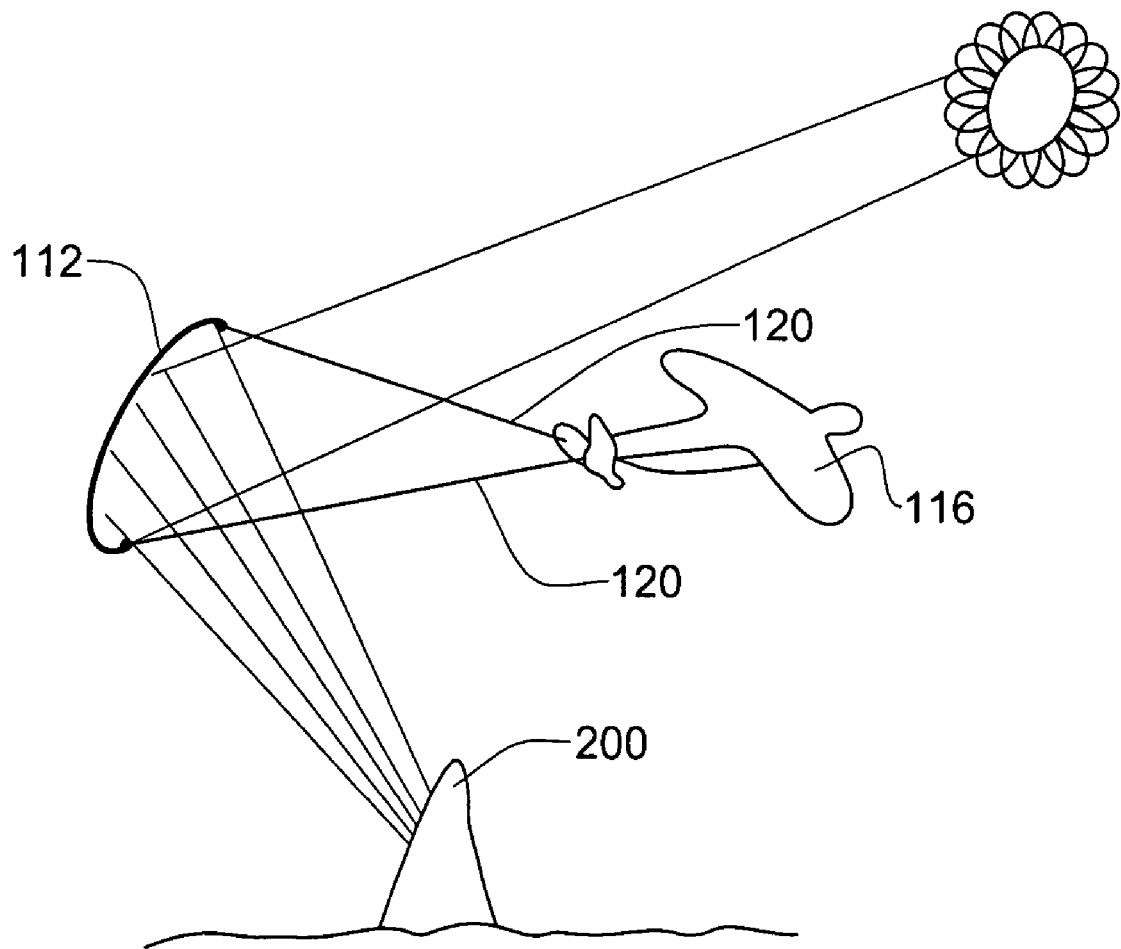
FIG. 3 illustrates a modification of the system in use.

As illustrated in FIG. 3, a modification of the system, generally indicated at 110, may be used to heat a predetermined area 200. The system comprises a flexible panel 112 tethered by cables 120 to a propulsion mechanism 116, such as an airborne vehicle. The propulsion mechanism 116 is adapted to keep the reflecting surface in a position such that it focuses sunlight onto the area 200, thereby heating it more that it would otherwise be. In addition, it may alter the lengths of the cables 120 in order to maintain the focus of the reflected sunlight on the area. Although only two cables are shown in FIG. 3, it will be appreciated any appropriate number of cables may be utilized in order to ensure that the propulsion mechanism is able to maintain an appropriate shape of the reflecting surface.

Those skilled in the art to which this invention pertains will readily appreciate that numerous changes, variations and modifications can be made without departing from the scope of the invention mutatis mutandis. For example, if a large region requires cooling, a large device may be deployed there.

The invention claimed is:

1. A system for affecting a local parameter, the system comprising:
   a substantially planar floating platform made up flat sunlight radiation reflecting panels and inflatable structures filled with lighter than air gas; and
   an aircraft configured to move the platform to a predetermined position chosen based on the effect of the system on the local parameter at the predetermined position; and
   a control station configured to receive information regarding local parameters, and, based on the information, issue instructions to the aircraft to selectively position the platform to reflect sunlight away from the Earth.

2. The system according to claim 1, wherein the aircraft is unmanned.

3. The system according to claim 1, wherein the substantially planar platform further comprises mechanism motor units.

4. The system according to claim 3, wherein the motor units are jet powered.

5. The system according to claim 3, wherein the motor units are electrically powered.

6. The system according to claim 5, further comprising a plurality of solar panels for providing power to the motor units.

7. The system according to claim 1, wherein at least a portion of the sunlight radiation reflecting panels are integral with floating platform.

8. The system according to claim 1, wherein the lighter-than-air gas comprises helium.

9. The system according to claim 1, wherein the information is received from a weather satellite or from other meteorological equipment.

10. The system according to claim 1, wherein the information includes at least one of the following:
    (a) local cloud cover data;
    (b) air currents data; or
    (c) intensity of sunlight data.

11. The system according to claim 1, wherein the control station is airborne.

12. The system according to claim 1, wherein the control station is a ground station.

* * * * *